US006490675B1

(12) United States Patent
Sugiura

(10) Patent No.: US 6,490,675 B1
(45) Date of Patent: Dec. 3, 2002

(54) CONVERTER AND CONVERSION METHOD

(75) Inventor: Hiroaki Sugiura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/342,916

(22) Filed: Jun. 30, 1999

(30) Foreign Application Priority Data

Jul. 2, 1998 (JP) .......................................... 10-187740
Jun. 21, 1999 (JP) .......................................... 11-174163

(51) Int. Cl.[7] .......................... G06F 9/44; G06F 12/10; G09G 5/02

(52) U.S. Cl. .......................... 712/225; 712/35; 712/36; 711/202; 711/216; 345/591

(58) Field of Search ...................... 700/95, 14; 348/94; 182/147, 112; 345/591; 702/167, 169; 716/19; 707/523; 712/38, 35, 36, 201, 43, 225; 710/50, 52, 73, 131, 130, 129, 14; 711/173, 149, 156, 202, 215, 216, 226

(56) References Cited

U.S. PATENT DOCUMENTS 4,866,629 A * 9/1989 Chen et al. .................. 700/95
5,600,764 A * 2/1997 Kakutani .................... 345/591
5,699,489 A 12/1997 Yokomizo .................. 395/109
5,774,570 A * 6/1998 Toju et al. .................. 382/112
5,801,855 A 9/1998 Ohta .......................... 358/518

* cited by examiner

*Primary Examiner*—Daniel H. Pan
(74) *Attorney, Agent, or Firm*—Fitzpatrick, Cella, Harper & Scinto

(57) ABSTRACT

The speed of conversion processing is limited if default conversion processing 1 and user unique conversion processing 2 are sequentially performed. In view of this, when an instruction of a characteristic of the conversion processing 2 is inputted by a user, conversion process data 3 is generated by integrating a characteristic of the default conversion processing 1 and the instructed characteristic of the conversion processing 2, and conversion processing is executed based on the generated conversion process data 3.

23 Claims, 23 Drawing Sheets

FIG. 10B

| | | | | | | | | | | | |
|---|---|---|---|---|---|---|---|---|---|---|---|
| 3 | | | | | | | | | | | |
| 10 | 12 | 7 | | | | | | | | | |
| 0 | 28 | 55 | 84 | 111 | 140 | 166 | 202 | 230 | 255 | | |
| 0 | 24 | 47 | 71 | 94 | 118 | 141 | 165 | 188 | 210 | 233 | 255 |
| 0 | 43 | 84 | 127 | 170 | 215 | 255 | | | | | |

CONVERTER AND CONVERSION METHOD

BACKGROUND OF THE INVENTION

The present invention relates to a converter and conversion method, and more particularly, to a converter and conversion method for changing a conversion characteristic according to a user's instruction, an image processing apparatus employing the converter and conversion method, and a recording medium in which information related to the conversion method is recorded.

Color conversion is an essential process for apparatuses forming color images. Therefore, conversion characteristics are determined so as to realize image quality which is acceptable to many users while taking the best advantage of the apparatus feature.

As the applicable range of color image forming apparatuses has expanded, it is difficult to satisfy all users with a provided default conversion characteristics only. A user can change the conversion characteristics through a user interface which is provided for operating the color image forming apparatus. As shown in FIG. 1, conversion processing according to user's instruction (hereinafter referred to as user unique conversion processing) is handled differently from default conversion processing. A default conversion processing is mostly realized by matrix operation called masking processing. Therefore, even if the user unique conversion processing is added to the masking processing, the processing time hardly becomes a problem.

Meanwhile, the amount of image data processed by a color image forming apparatus increases every year, and the demand for a high quality image is rising. Therefore, instead of simple masking processing, highly optimized conversion processing using a lookup table (LUT) is necessary in the default conversion processing.

In addition to the increased operation amount in the conversion processing, because color image forming apparatuses are more frequently used, reduced time in color image formation is demanded, thus requiring an increased speed in the conversion processing. However, increasing the speed of the conversion processing is limited if the default conversion processing and user unique conversion processing are performed sequentially as shown in FIG. 1.

Furthermore, when two or more conversion processes are combined into one LUT to effectively increase the overall conversion processing speed, a problem arises in that the conversion characteristics are changed, which will be described later in detail.

SUMMARY OF THE INVENTION

The present invention is made in consideration of the foregoing problems, and has as its object to provide a converter and conversion method for executing default conversion processing and user unique conversion processing at high speed, an image processing apparatus employing the converter and conversion method, and a recording medium in which data related to the conversion method is recorded.

To achieve the above object, the present invention provides a converter comprising: instruction means for instructing a conversion characteristic desired by a user; generation means for generating conversion process data where a default conversion characteristic and the instructed conversion characteristic are integrated; and conversion means for executing conversion processing based on the generated conversion process data.

Furthermore, another object of the present invention is to provide a converter and conversion method which can suppress changes in a conversion characteristic when conversion processes are integrated, and a recording medium in which data related to the conversion method is recorded.

To achieve the above object, the present invention provides a conversion method of performing conversion processing by generating a conversion table where two or more conversion processes are integrated, the method comprising the step of generating the conversion table based on grid position data respectively corresponding to a permutation of conversion processes to be integrated, the grid position data provided additionally to data representing the conversion processes to be integrated.

Furthermore, the present invention provides a converter for performing conversion processing by generating a conversion table where two or more conversion processes are integrated, the converter comprising: acquisition means for acquiring grid position data corresponding to permutation of the conversion processes to be integrated, the grid position data being stored in one of information representing the conversion processes to be integrated; and generation means for generating the conversion table by integrating the conversion processes to be integrated in the integration order, based on the acquired grid position data.

Still further, the present invention provides a converter for performing conversion processing by generating a conversion table where two or more conversion processes are integrated, the converter comprising: acquisition means for acquiring a grid position data identifier corresponding to a permutation of the conversion processes to be integrated, the grid position data identifier being stored in one of information representing the conversion processes to be integrated, and acquiring grid position data, corresponding to the acquired grid position data identifier, from the data or another data from which the grid position data identifier is acquired; and generation means for generating the conversion table by integrating the conversion processes to be integrated in the integration order, based on the obtained grid position data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 10B shows grid position data in a case where the one-dimensional grid number is 10, two-dimensional grid number is 12, and three-dimensional grid number is 7;

DETAILED DESCRIPTION OF THE PREFERRED EMBODIMENT

Preferred embodiment of the present invention will be described in detail in accordance with the accompanying drawings.

Generating LUT

Figure 1:
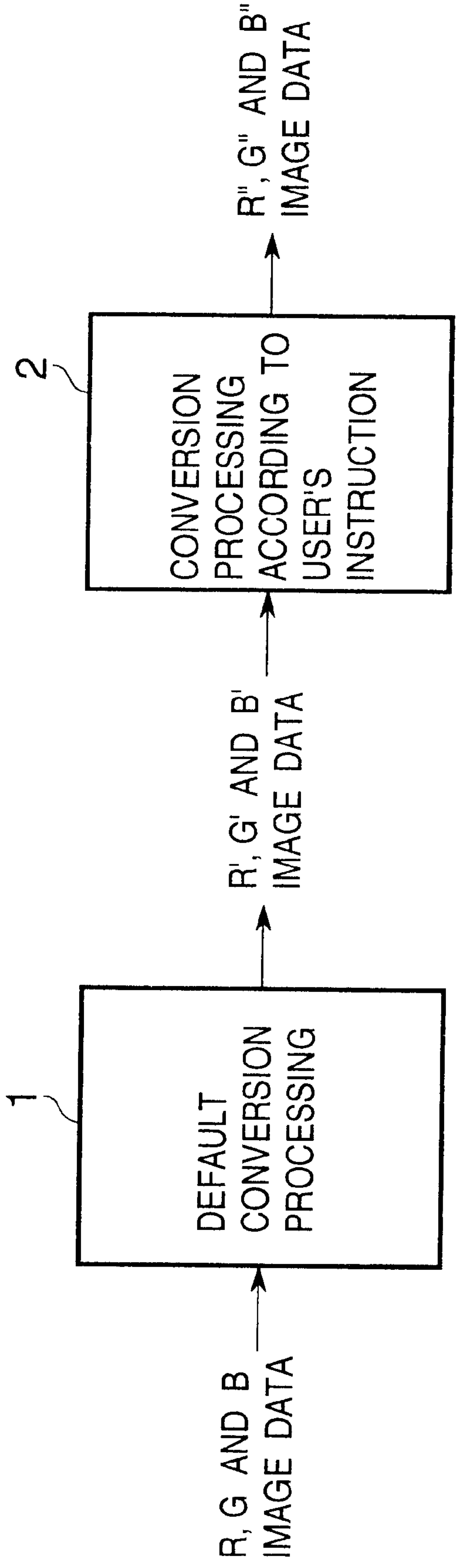
FIG. 1 is a flowchart of conversion processing.
Figure 2:
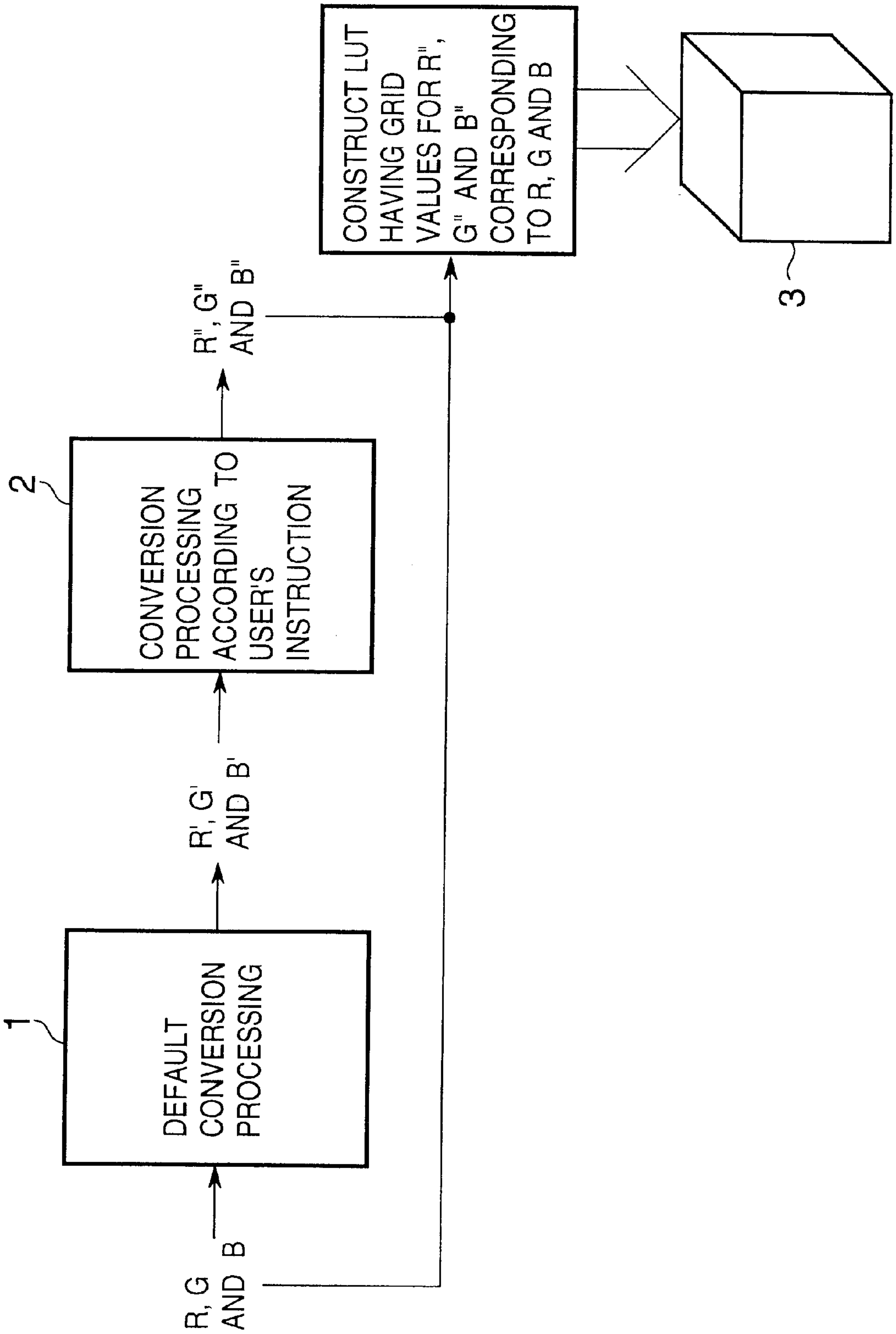
FIG. 2 is a flowchart of conversion processing according to the present embodiment.

According to the present embodiment, conversion process data 3, an integrated conversion process composing of a default conversion process and a user unique conversion process as shown in FIG. 2, is generated before image data conversion processing is performed. Hereinafter, the generation step of the conversion process data 3 is described, using a converter which inputs/outputs R, G and B image data as an example.

As shown in FIG. 2, in a case of inputting a particular combination of R, G and B data, the output data of the default conversion processing (hereinafter referred to as "conversion processing 1") is R', G' and B' data, then when R', G' and B' data is inputted to the user unique conversion processing (hereinafter referred to as "conversion processing 2"), the output thereof is R", G" and B" data.

Figure 3:
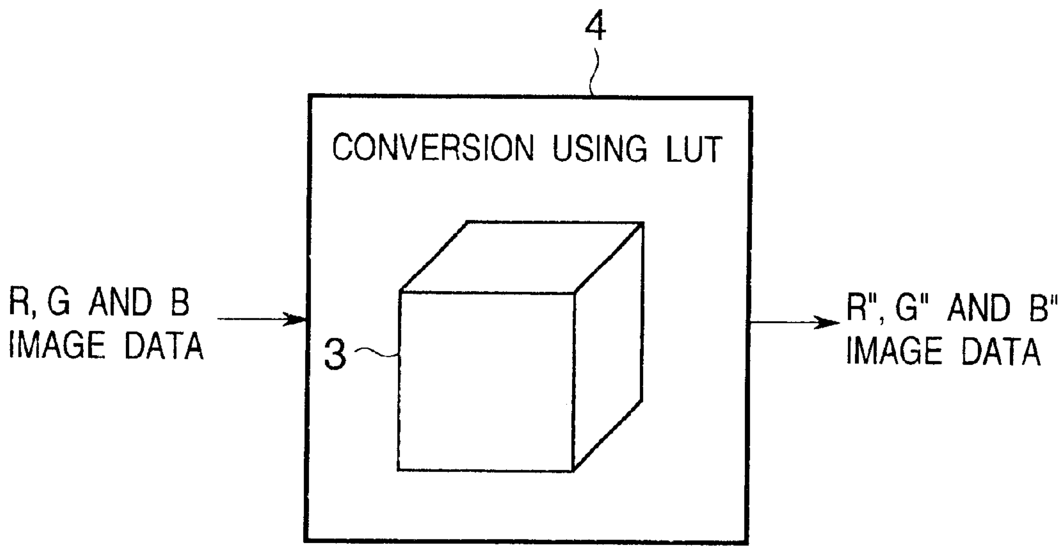
FIG. 3 is an explanatory view of a LUT integrating two conversion processes.

By inputting a combination of R, G and B data corresponding to the grid position in the LUT, R", G" and B" data having the LUT grid values are outputted. Therefore, inputted values which correspond to all grid points of the LUT are inputted in the LUT data arrangement order, and outputs thereof are sequentially stored, thereby obtaining conversion process data 3 integrating the two conversion processes, which is to be stored in the LUT. How the LUT grid positions are arranged depends upon the characteristics of the two conversion processes, available memory capacity, and required conversion precision. Because of the flexibility of conversion characteristics realized by the LUT, any cases can be handled. Actual image data conversion processing can be performed at higher speed by utilizing a LUT 4 storing conversion process data 3 integrally having two conversion processes as shown in FIG. 3.

Figure 4:
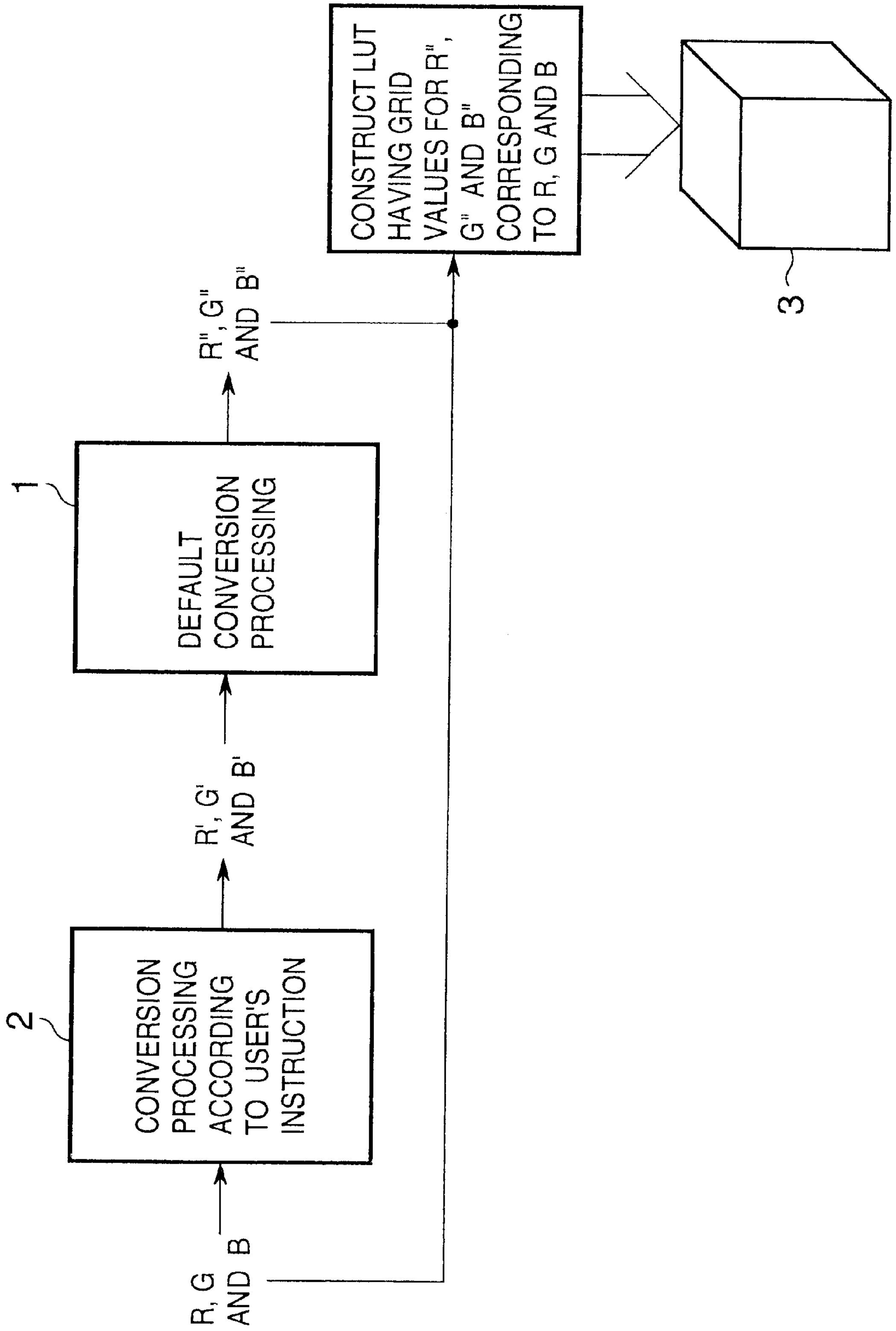
FIG. 4 is a second flowchart of conversion processing according to the present embodiment.
Figure 5:
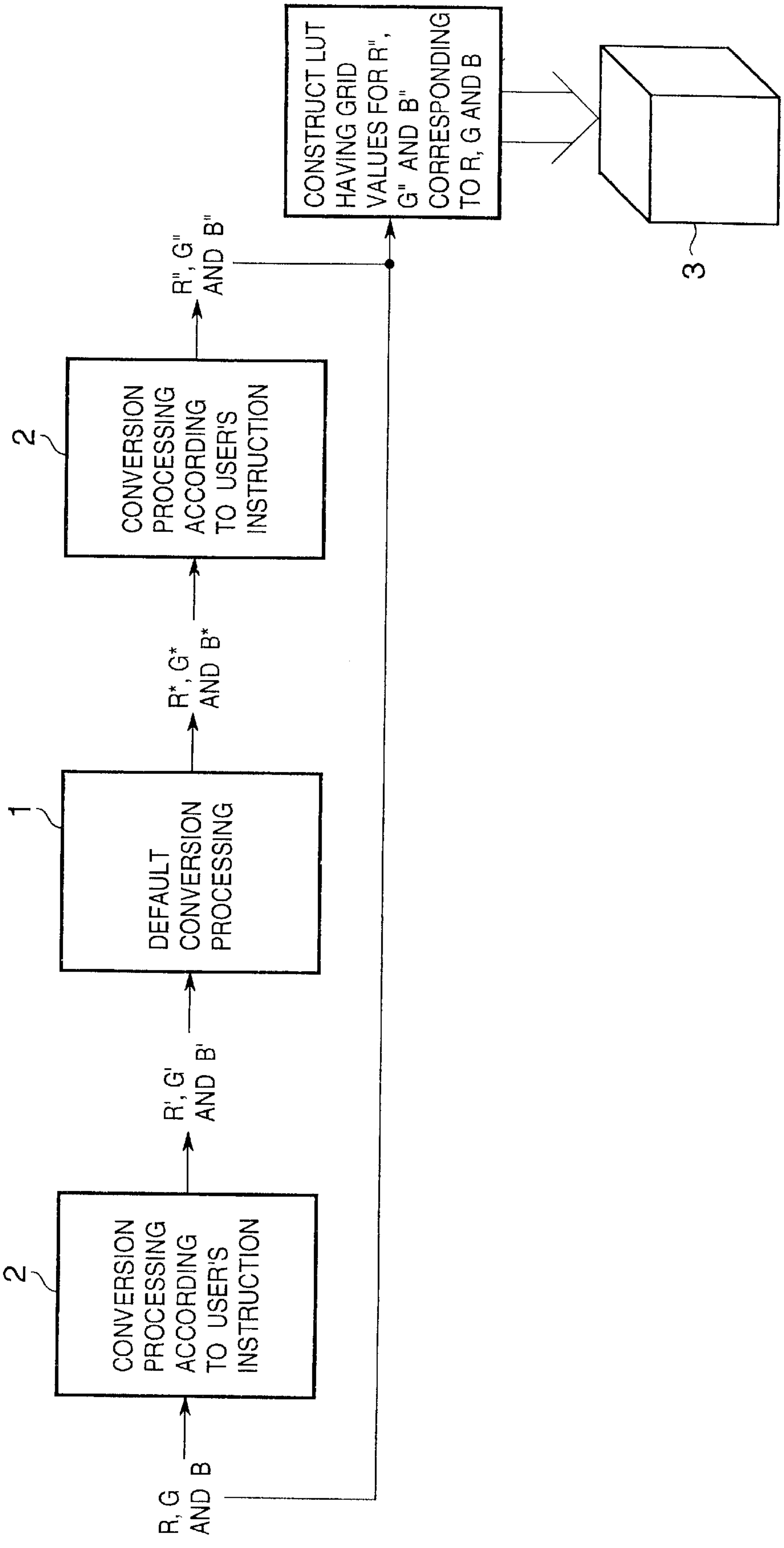
FIG. 5 is a third flowchart of conversion processing according to the present embodiment.

Note that in the above description, although the conversion processing 2 is performed after the conversion processing 1, it is apparent that the conversion process data 3 can be similarly generated even if the conversion processing 2 is performed before the conversion processing 1 as shown in FIG. 4, or the conversion processing 2 is performed before and after the conversion processing 1 as shown in FIG. 5.

Moreover, although the above description does not mention specific processing contents of the conversion processing 1 and conversion processing 2, the conversion processing 1 and 2 may be any conversion processing, e.g., masking input data, luminance-density conversion, under color removal (UCR), masking output data, gamma correction, tone correction, color space conversion, color space compression/decompression and so on. As a matter of course, when one or both of the conversion processes 1 and 2 are realized by the LUT, the present embodiment is most effective in terms of both the processing speed and circuit size.

Problem of Integration

If two or more conversion processes are simply integrated into one LUT, an output of the conversion processing using the integrated LUT may be far different from an output of the conversion processes performed independently. Particularly if one of the integrated conversion processes employs a LUT, this problem is often not negligible.

Figure 8:
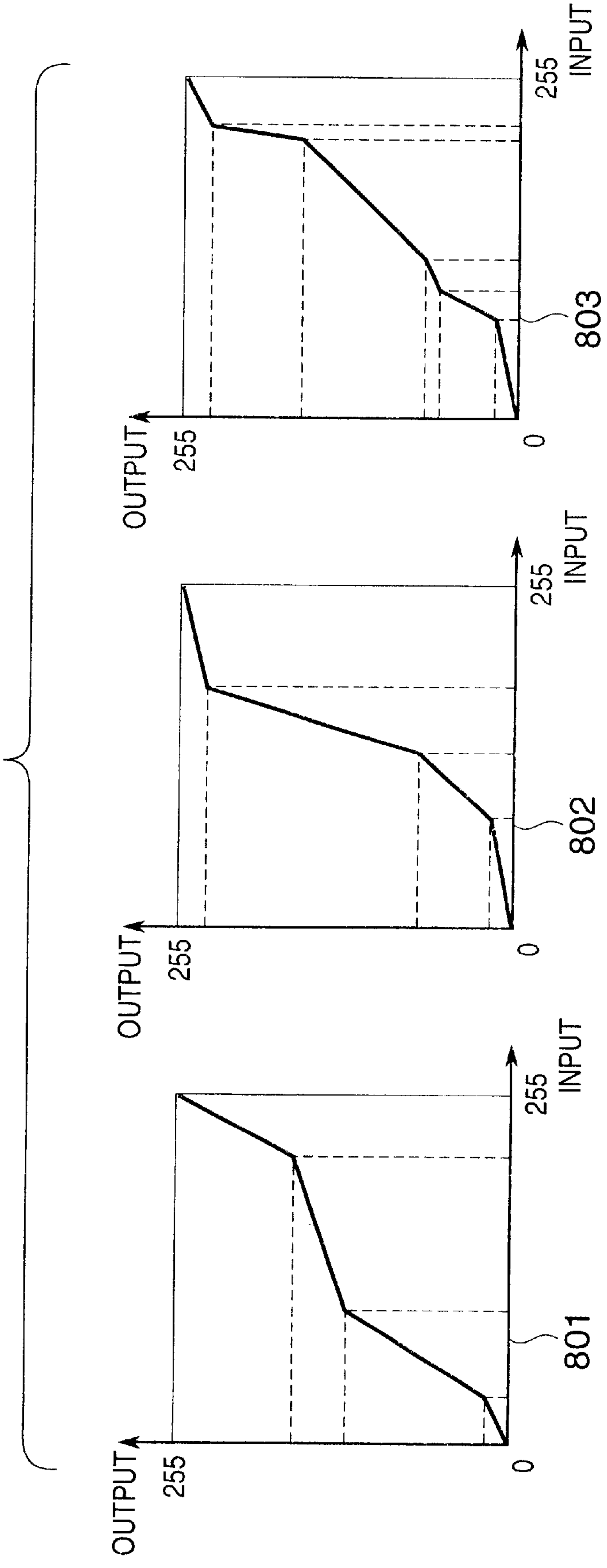
FIG. 8 is an explanatory view explaining a problem in LUT integration.

An example is described hereinafter for a case where two simple linear LUTs are integrated, i.e., a linear LUT having a conversion characteristic of reference numeral 801 in FIG. 8 and a linear LUT having a conversion characteristic of reference numeral 802 are integrated. Assume that the LUT having the conversion characteristic 801 is in the input side and the LUT having the conversion characteristic 802 is in the output side.

Figure 9:
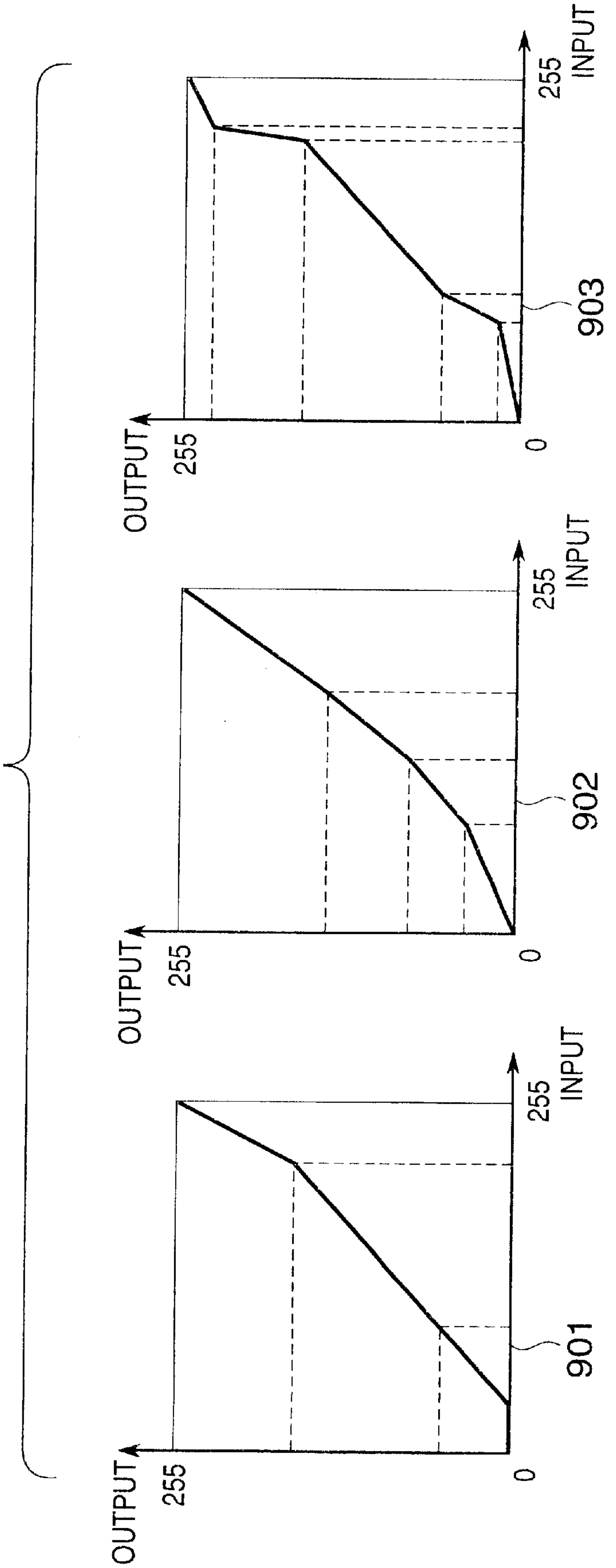
FIG. 9 is an explanatory view explaining a problem in LUT integration.

When plural conversion processes are integrated into one LUT, the conversion characteristic changes depending on how grid positions are arranged in an integrated LUT. First assume that the conversion characteristics 801 and 802 are integrated based on the grid positions of 801. In this case, the conversion characteristic of the integrated LUT has the characteristic 901 in FIG. 9, which largely differs from the conversion characteristic 803 in FIG. 8 where conversion processes using two LUTs are independently performed. Next, assume that the conversion characteristics 801 and 802 are integrated based on the grid positions of 802. In this case, the conversion characteristic of the integrated LUT has the characteristic 902 in FIG. 9, which also largely differs from the conversion characteristic 803 in FIG. 8. On the contrary, if the grid positions of an integrated LUT is predetermined by permutation (0, 32, 74, 98, 205, 216, 255), the conversion characteristic of the integrated LUT shows the characteristic 903 in FIG. 9, which is more similar to the conversion characteristic 803 in FIG. 8.

Figure 10A:
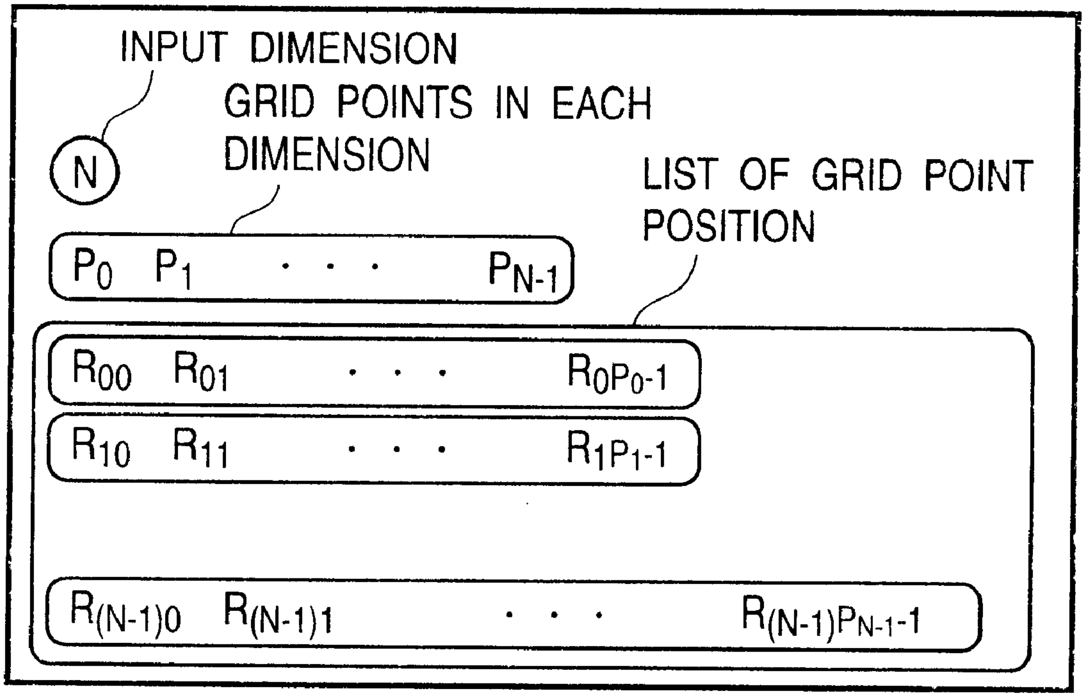
FIG. 10A shows the description form of grid position data.

In the following description, the aforementioned permutation indicative of grid positions is referred to as "grid position data". The above description is an example of grid position data in a LUT having linear input data. In a case where an input is n(>1) dimensional, grid position data can be described in the form shown in FIG. 10A. For instance, assuming a case of three-dimensional input where the number of grids in the first dimension is 10, the number of grids in the second dimension is 12, and the number of grids in the third dimension is 7, the grid position data is described as FIG. 10B.

When integrating the foregoing two linear LUTs, the most optimum grid positions of an integrated LUT can be obtained based on the LUT in the input side and the LUT in the output side. However, in general, determining the most optimum grid positions is not easy when integrating two given conversion processes into one LUT. If the most optimum grid positions of an integrated LUT are to be determined at the time of integrating given conversion processes, much longer processing time is required than the conversion processing time which has been reduced by integration.

To solve the problem of the long processing time necessary for integrating two or more conversion processes into one LUT without change of the conversion characteristic, not only the data for the conversion processing, but also grid position data of an integrated LUT corresponding to a combination of conversion processes to be integrated is prepared in advance, and at the time of integration, an integrated LUT is generated using the grid position data. Accordingly, in a conversion processing and a converter which realize two or more conversion processes with one LUT, an integrated LUT can be generated in a short time period and the conversion characteristics do not largely differ before and after the integration.

Specific Integration Processing

In the following description, data which realizes conversion processing is referred to as "conversion information". The conversion information is classified into conversion processing procedures implemented by electronic circuits or programs, and conversion parameters where variables (parameters) used for conversion processing are described in a predetermined form. Note, when the conversion parameters are used, the actual processing is realized by an electronic circuit, program or the like (conversion processing executing unit) which reads the conversion parameters and performs processing accordingly. Changes in conversion characteristics are caused not by the conversion processing executing unit, but by the conversion parameters. Thus, information describing the conversion parameters is called conversion information.

Information used for specifying a specific conversion information from a plurality of conversion information is called a "conversion information identifier." Generally, an integer is used as a conversion information identifier, but a character string may be used. In the following description, an integer value is used as the conversion information identifier. Moreover, a unit which performs processing for generating an integrated LUT from a plurality of conversion information is called an "integrated LUT generator". The integrated LUT generator is realized by an electronic circuit or a program or the like.

[First Method]

Figure 11:
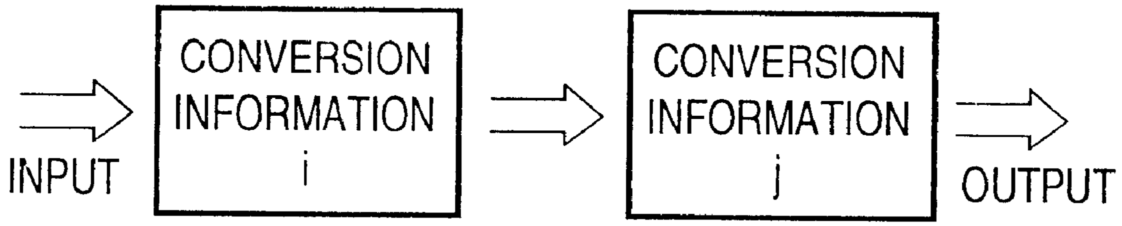
FIG. 11 is an explanatory view of integrating two conversion data.

The first method is proposed for managing grid position data used for generating an integrated LUT in the conversion information in the input side or output side. As shown in FIG. 11, grid position data, corresponding to a conversion information identifier of conversion information j in the output side which can be integrated, is stored in the conversion information i in the input side. At the time of integration, the integrated LUT generator reads grid position data corresponding to the conversion information identifier of the conversion information j in the output side out of the conversion information i in the input side, and generates an integrated LUT using the grid position data.

Figure 12:
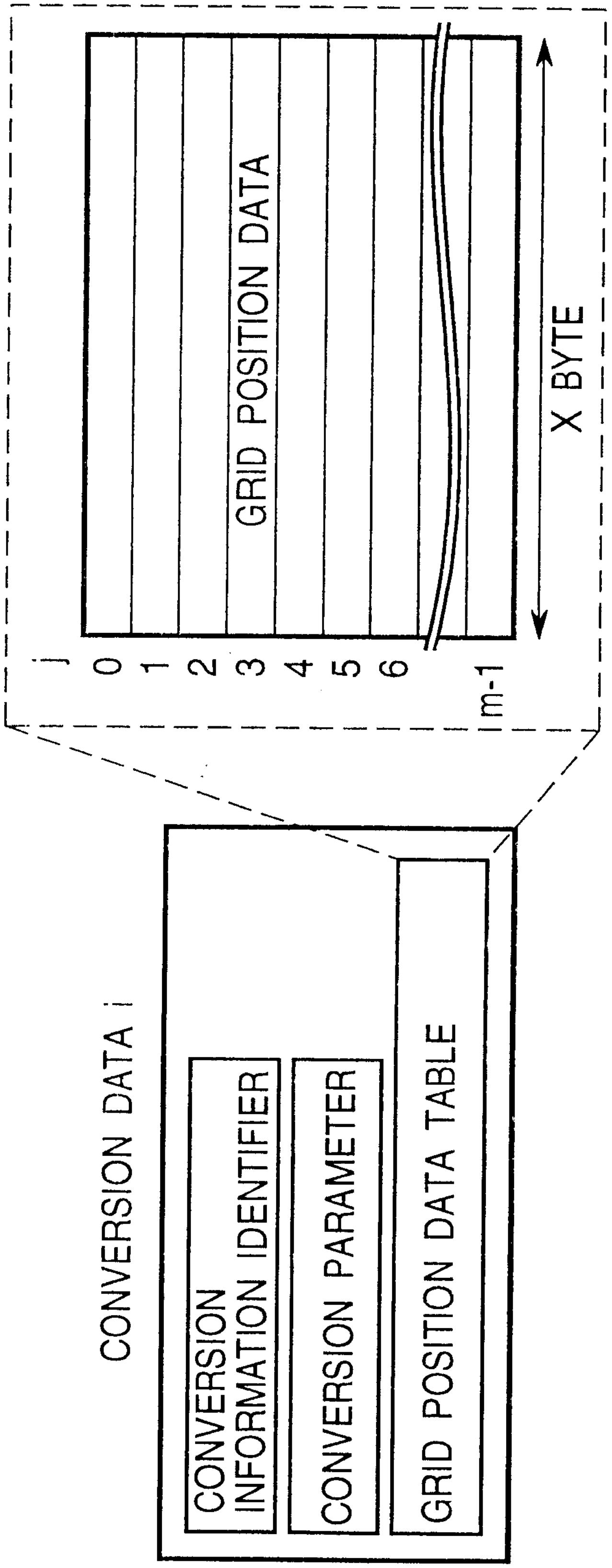
FIG. 12 shows a storage example of a first integration method.

A configuration realizing the first method is shown in FIG. 12. Grid position data is stored for each conversion information j at intervals of X byte. When conversion information identifier is j, X j bytes are added to the head address of the grid position data table. Accordingly, necessary grid position data can be easily obtained. The foregoing first method is particularly advantageous in a case of integrating two conversion processes.

[Second Method]

Next, the second method of managing grid position data is proposed. According to the second method, instead of directly obtaining grid position data which is used for generating an integrated LUT based on a conversion information identifier, grid position data identifier is acquired from the conversion information identifier, and grid position data is obtained from the acquired grid position data identifier.

Figure 13:
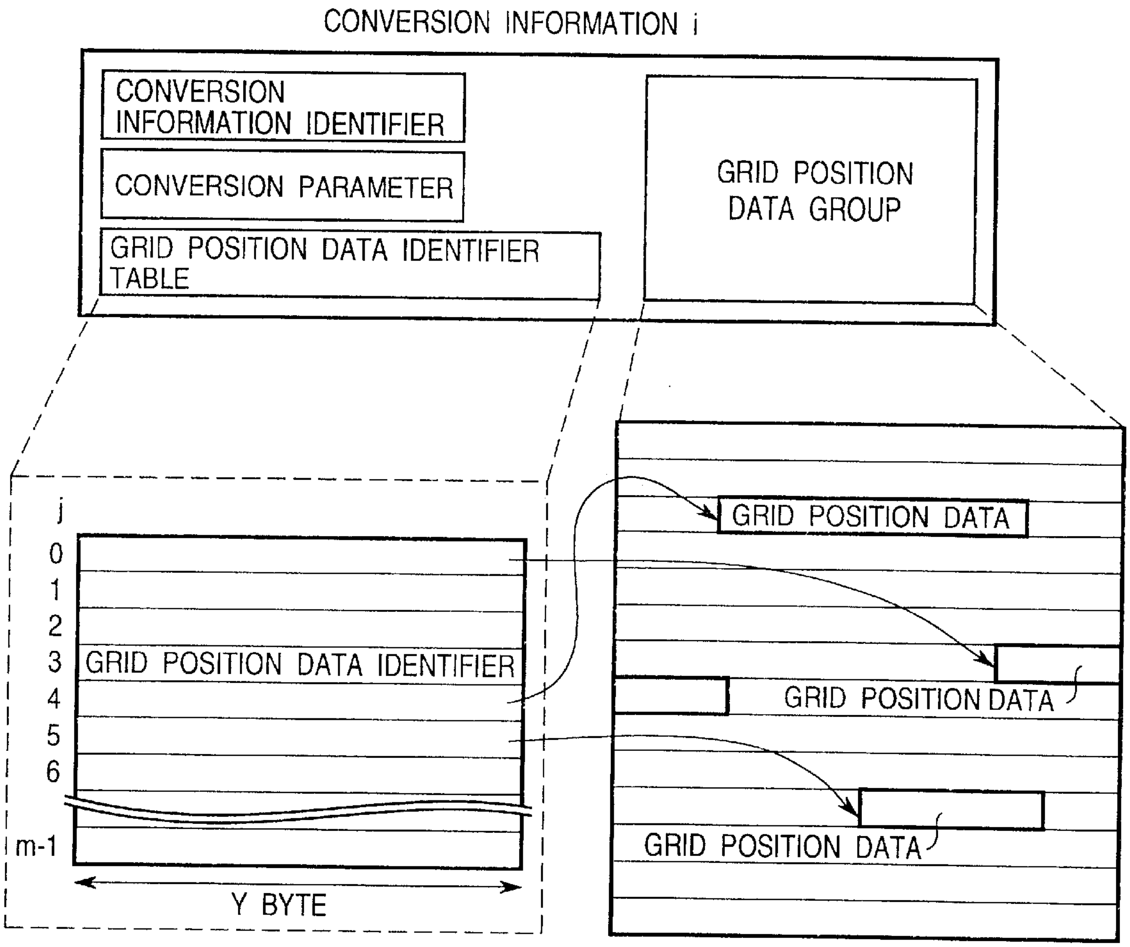
FIG. 13 shows a storage example of a second integration method.

A configuration implementing the second method is shown in FIG. 13. A grid position data identifier is stored for each conversion information j at intervals of Y byte. When the conversion information identifier is j, Y·j bytes are added to the head address of the grid position data identifier table. Accordingly, necessary grid position data identifier can be easily acquired, and from the acquired grid position data identifier, grid position data can be obtained.

Figure 14:
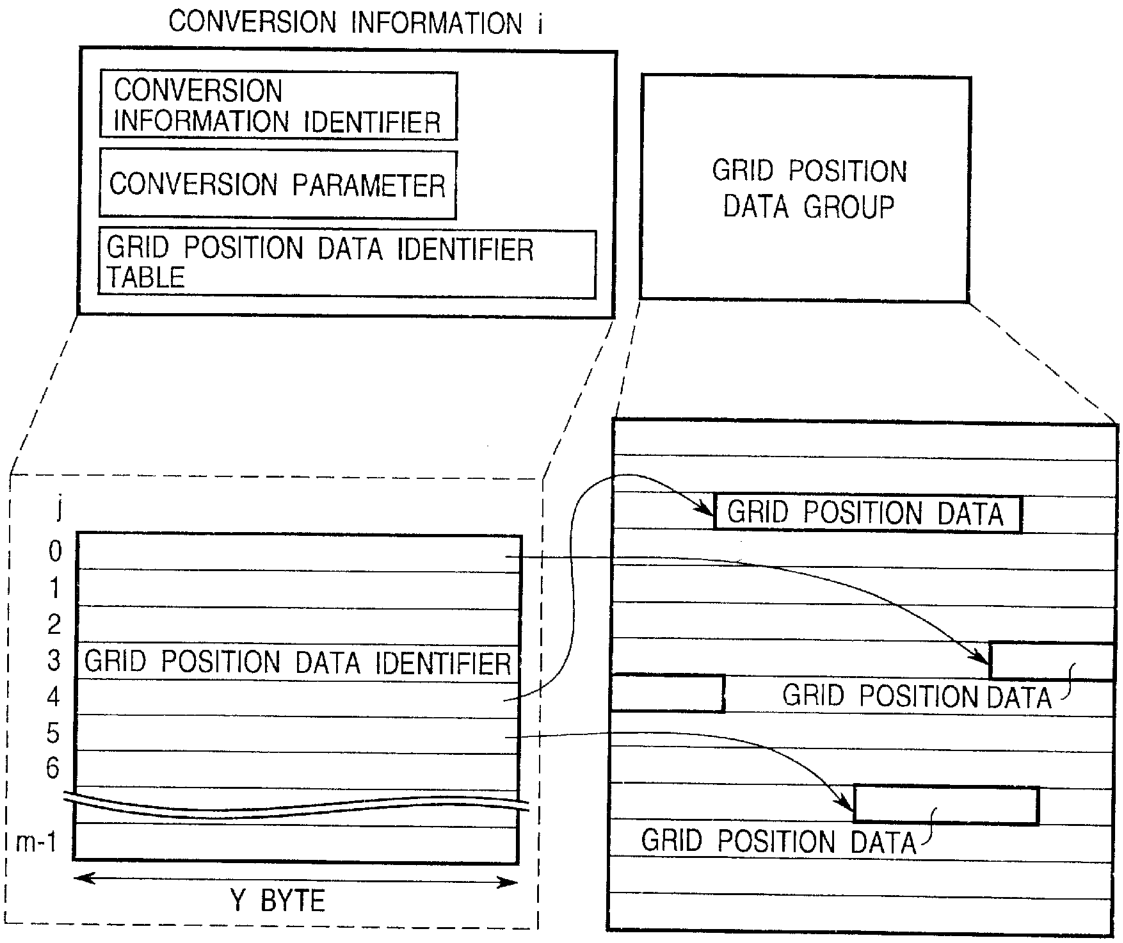
FIG. 14 shows a second storage example of the second integration method.

By virtue of using grid position data identifiers, it is possible to handle both the case where grid position data is stored within the conversion information as shown in FIG. 13 or the case where grid position data is stored outside the conversion information as shown in FIG. 14.

In a case where grid position data is stored within the conversion information, a grid position data identifier can be expressed by a number or the like which is valid only within the conversion information. In a case where grid position data is stored outside the conversion information, a grid position data identifier is expressed by data indicative of a file storing grid position data, or a combination of data identifying a file or database storing plural grid position data, and data identifying desired grid position data therein. Furthermore, by using Uniform Resource Identifier (URI) as the grid position data identifier, grid position data can be acquired via various networks.

Note that aforementioned file is a unit for recording data in a non-volatile storage medium such as hard disk, floppy disk, optical disk, flash memory or the like, or a unit for managing data in a volatile storage medium such as DRAM or SRAM or the like. Further, the database is a system in which a request is transmitted in a predetermined form and corresponding data is returned (can be obtained). The database may be operated in the apparatus same as the integrated LUT generator, or may be operated in another apparatus connected to the integrated LUT generator via communication means.

According to the second method, grid position data commonly used for combining a plurality of conversion processes can be shared; thus, a storage area necessary for the grid position data can be saved.

Note in the first and second methods, it is apparent that the same effect can be attained by storing grid position data corresponding to conversion information in the input side which can be integrated to conversion information in the output side.

[Integration Processing of Three or More Conversion Data]

To integrate three or more conversion data, the aforementioned first or second method is applicable. More specifically, grid position data or a grid position data identifier is acquired from a plurality of conversion information identifiers instead of acquiring it from one conversion information identifier. To put it in the simplest sense, conversion information identifiers of the conversion processes to be integrated are rearranged in the order of integration and used as new identifiers. By this, three or more conversion processes can be integrated.

Figure 15:
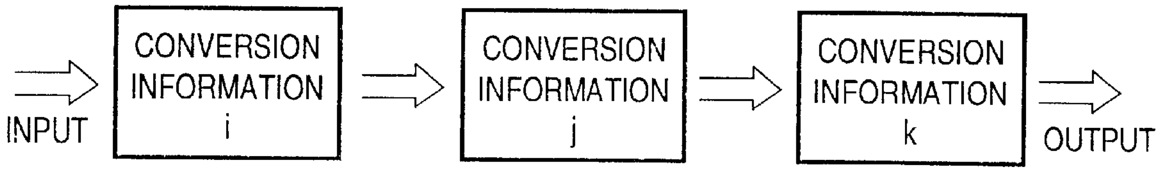
FIG. 15 is an explanatory view of integrating three conversion data.
Figure 16A:
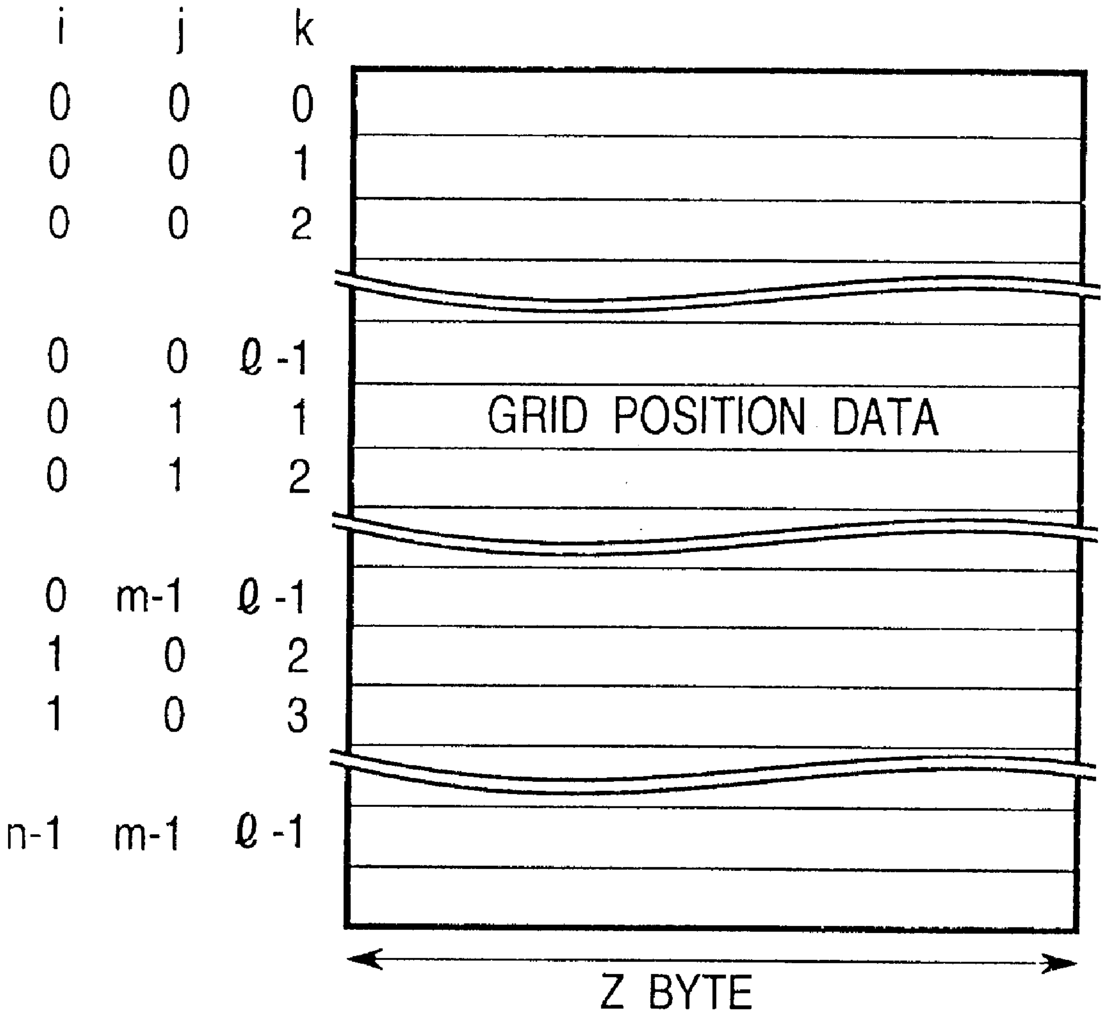
FIGS. 16A and 16B show a table used in a case of integrating three conversion information as shown in FIG. 15.
Figure 16B:
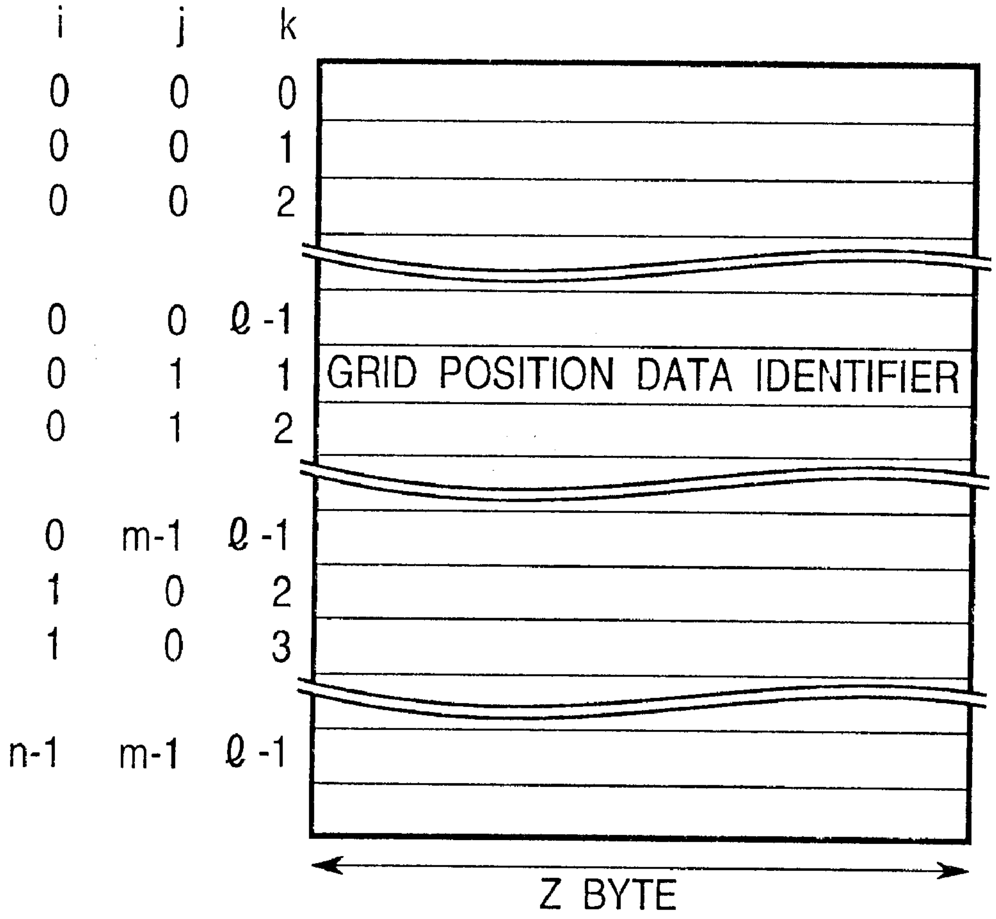

FIGS. 16A and 16B show tables used in a case of integrating three conversion processes shown in FIG. 15. By replacing the grid position data table shown in FIG. 12 with the table in FIG. 16A and replacing the grid position data identifier table shown in FIGS. 13 and 14 with the table in FIG. 16B, three conversion processes shown in FIG. 15 can be integrated. However, according to this technique, ineffective combinations increases if a large number of conversion processes is to be integrated, thus requiring a larger memory area for storing the tables shown in FIGS. 16A or 16B.

For a more sophisticated technique, there is a method of realizing integration with a hash table using a key value calculated from a permutation of conversion information identifiers of the conversion processes to be integrated. Since a hash table is a well-known technique, detailed description thereof is not provided herein. However, an example of integrating three conversion processes is described below.

Figure 17A:
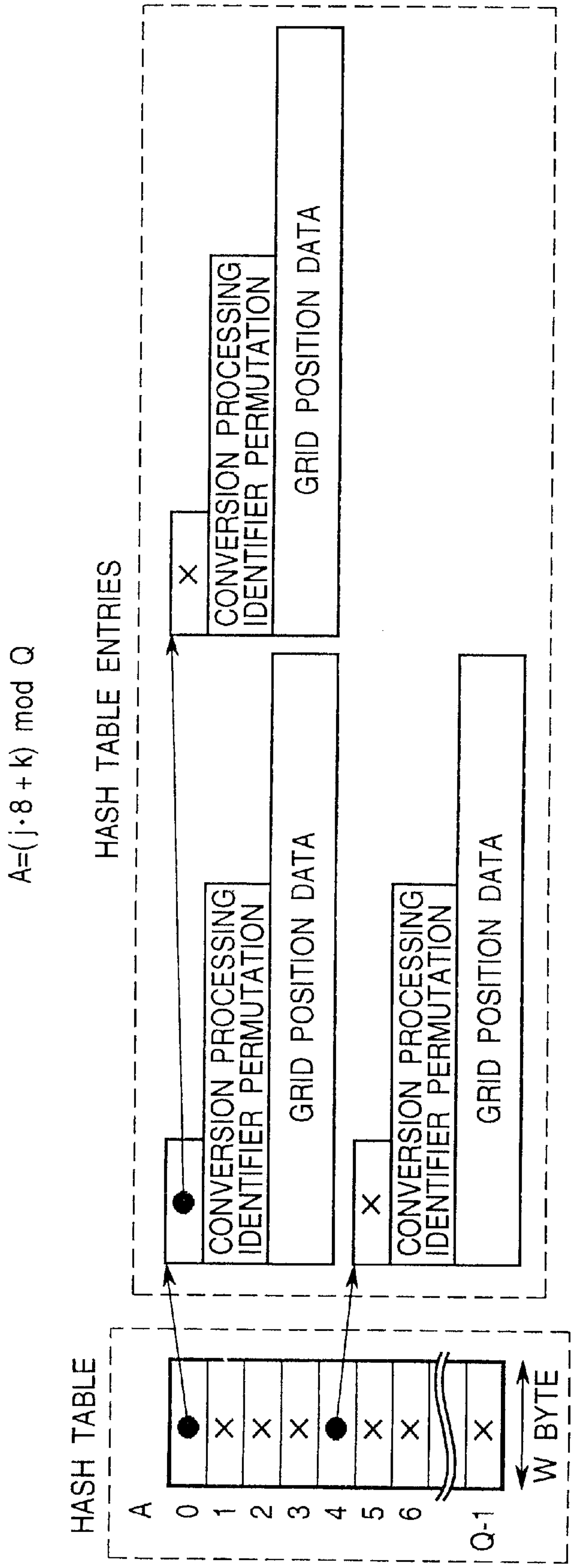
FIGS. 17A and 17B are explanatory views of explaining integration processing using a hash table.
Figure 17B:
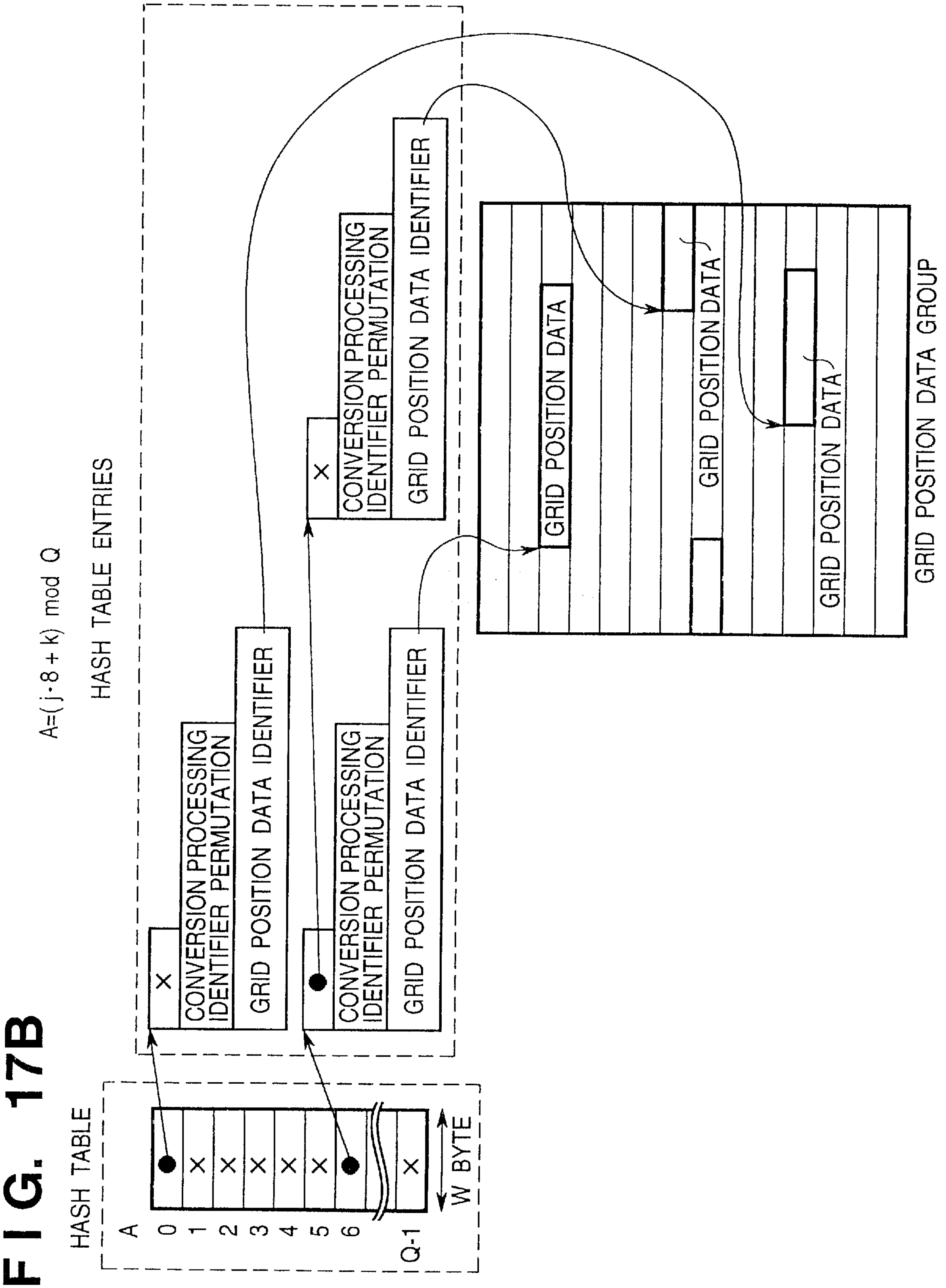

Assuming that the second conversion information identifier is j and the third conversion information identifier is k, and function A=F(j, k) having j and k as variables is defined as, e.g., A=(8·j+k) mod Q, the value A is calculated according to actual conversion information identifiers. The head address position of the hash table +A·W gives the identifier which indicates the position of hash table entry. There are different combinations of j and k having the same A. For this reason, permutation of conversion information identifiers, including conversion information identifiers arranged in the order of conversion processes, is stored in the hash table entry in order to obtain grid position data in the entry (see FIG. 17A) or grid position data identifier in the entry (see FIG. 17B) having a matched permutation of conversion information identifiers.

Note that a part or all of the hash table entries besides the hash table, and/or the grid position data group may be stored inside or outside the conversion information.

[Third Method]

Proposed as the third method of managing grid position data is preferably used when there are two or more conversion processes to be integrated.

Figure 18:
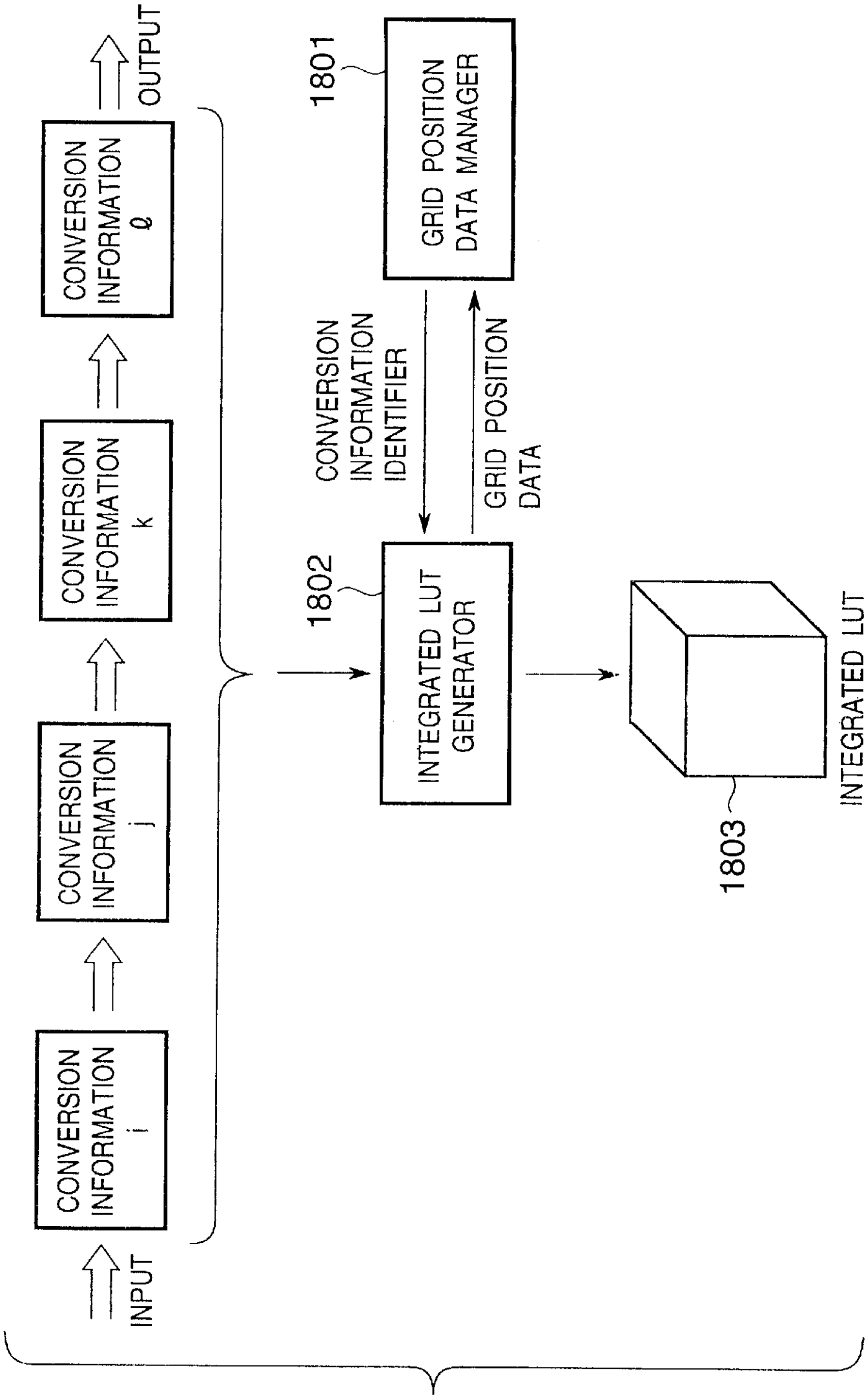
FIG. 18 is an explanatory view of a third integration method.

The third method is not a method of incorporating grid position data or a grid position data identifier, used for generating an integrated LUT, into conversion information, but is a method of managing grid position data for generating an integrated LUT independently of conversion information. More specifically, as shown in FIG. 18, a grid position data manager 1801 manages grid position data, used for generating an integrated LUT, independently of conversion information. An integrated LUT generator 1802 acquires grid position data corresponding to a conversion information identifier from the grid position data manager 1801, and generates an integrated LUT 1803 by using the acquired grid position data.

Figure 19:
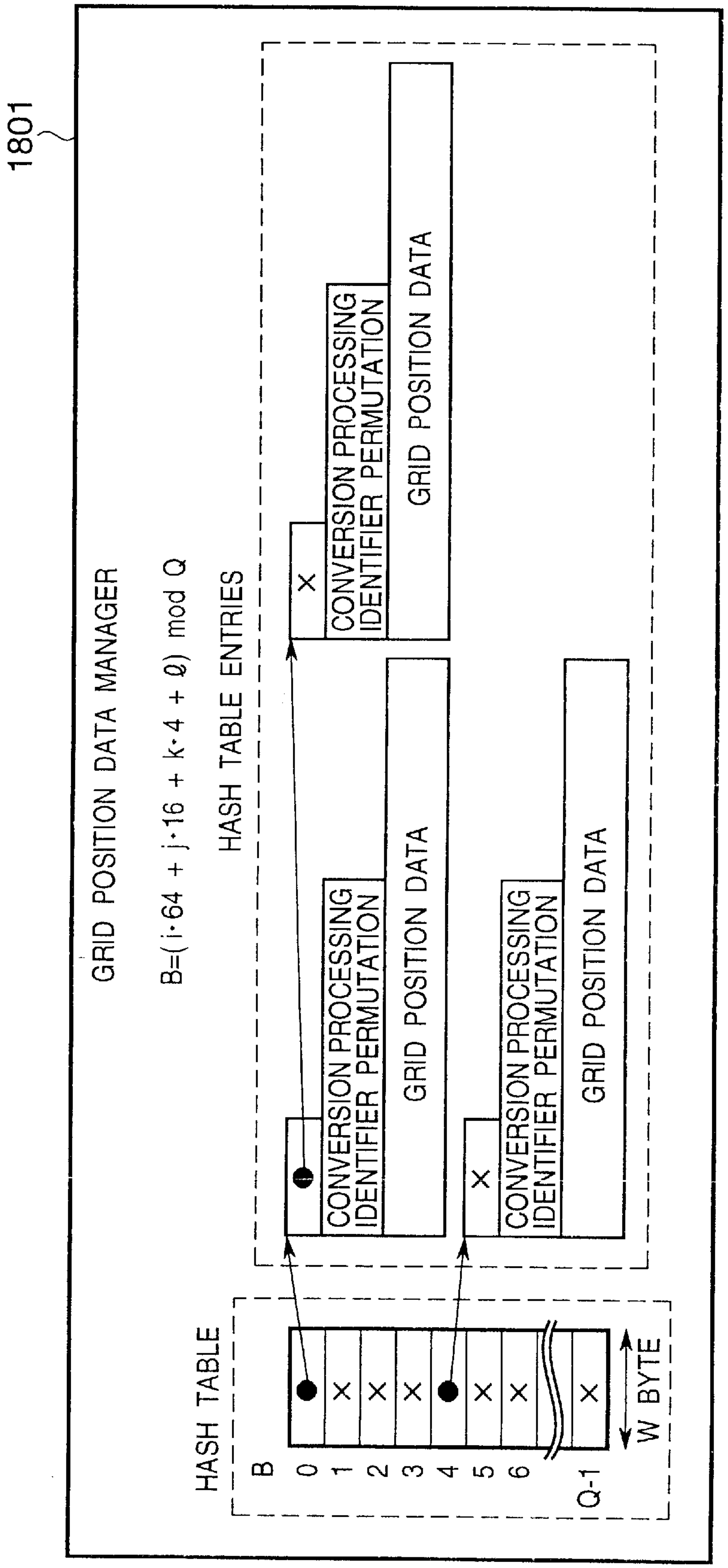
FIG. 19 shows a configuration of a hash table.
Figure 20:
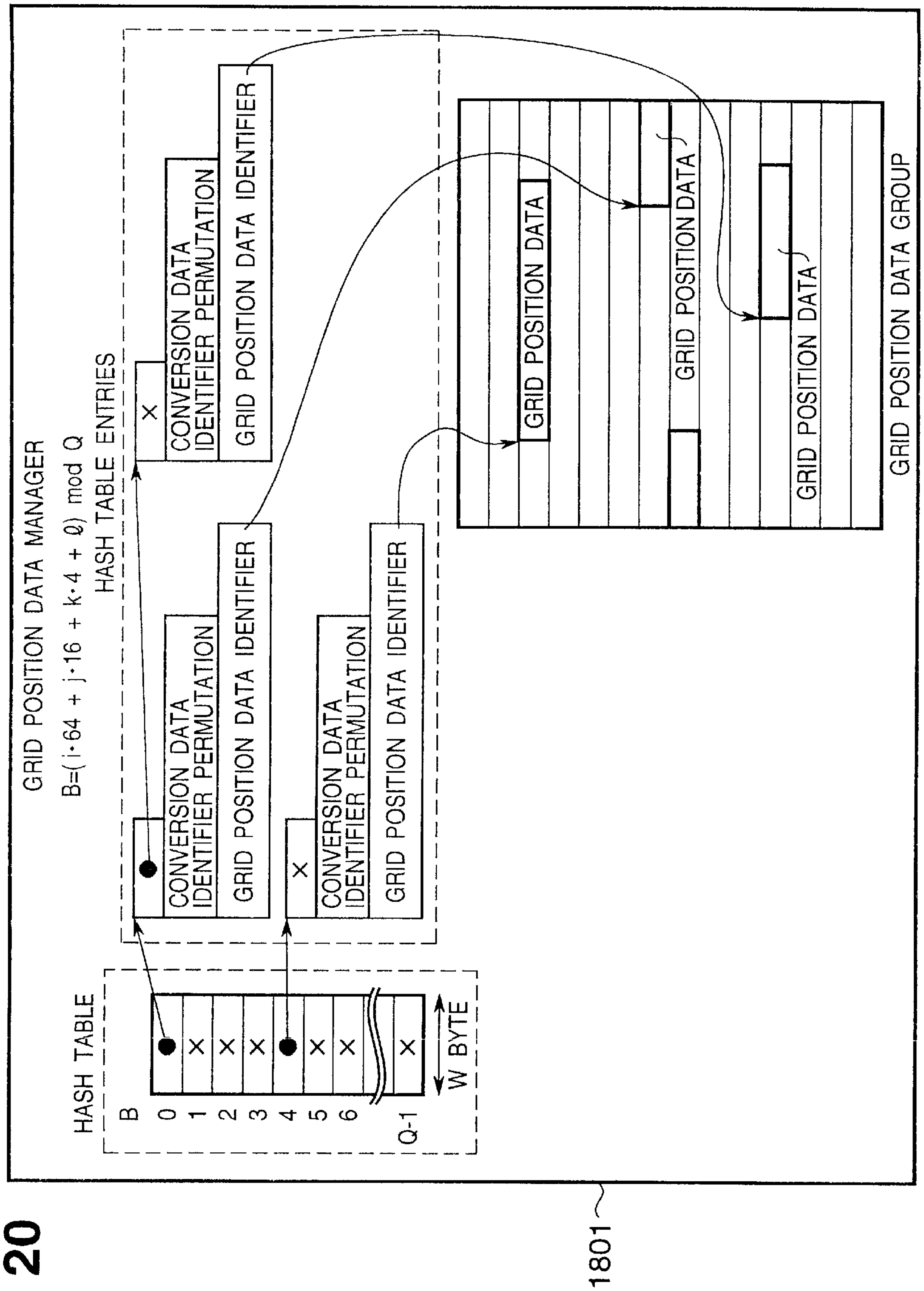
FIG. 20 shows a second configuration of a hash table.

In order to efficiently obtain grid position data corresponding to a particular combination of conversion processes, the grid position data manager 1801 can implement a hash table, from which desired grid position data can be obtained from a grid position data group by using a key value generated from respective conversion information identifiers. The hash table is configured with, as described above, grid position data stored in the hash table entry as shown in FIG. 19 or grid position data identifiers stored in the hash table entry as shown in FIG. 20.

The third method enables to share grid position data in many more cases than the second method. Therefore, a memory area necessary for storing the grid position data can be further reduced. Moreover, in the third method, the integrated LUT generator 1802 and grid position data manager 1801 are completely independent of conversion information, i.e., conversion processing. Therefore, even if conditions change, for instance, even if conversion processing to be integrated is added, conversion information need not be changed. Similarly, although the integrated LUT generator 1802 and grid position data manager 1801 are optimized to conditions such as the number of conversion processes to be integrated, and the number of combinations of integrating conversion processes or the like, the integrated LUT generator 1802 and grid position data manager 1801 can be changed regardless of the conversion processing configuration such as the conversion data form or the like.

Note that as long as grid position data is obtained, any of the first, second, and third methods can generate an integrated LUT 1803 based on the grid position data according to the above-described technique.

If conversion processing to be used and the combination of conversion processes to be integrated are known, grid position data can be calculated at the time of generating conversion information. However, besides this case, grid position data cannot be calculated at the time of generating conversion information. Even in this case, however, applicable conversion processing is periodically examined, or is examined when the applicable conversion processing changes, to search for a combination of the conversion processes to be integrated, then grid position data corresponding to the combination may be calculated. Beside generation of conversion information, in a case of calculating grid position data, the grid position data management according to the third method is particularly effective.

Furthermore, although the above example has been given on a case of inputting and outputting R, G and B image data, the present embodiment is also applicable to inputting/outputting data in an arbitrary color space, e.g., CMY, CMYK, L*a*b*, L*u*v*, XYZ and so on.

Construction of Converter

Figure 6:
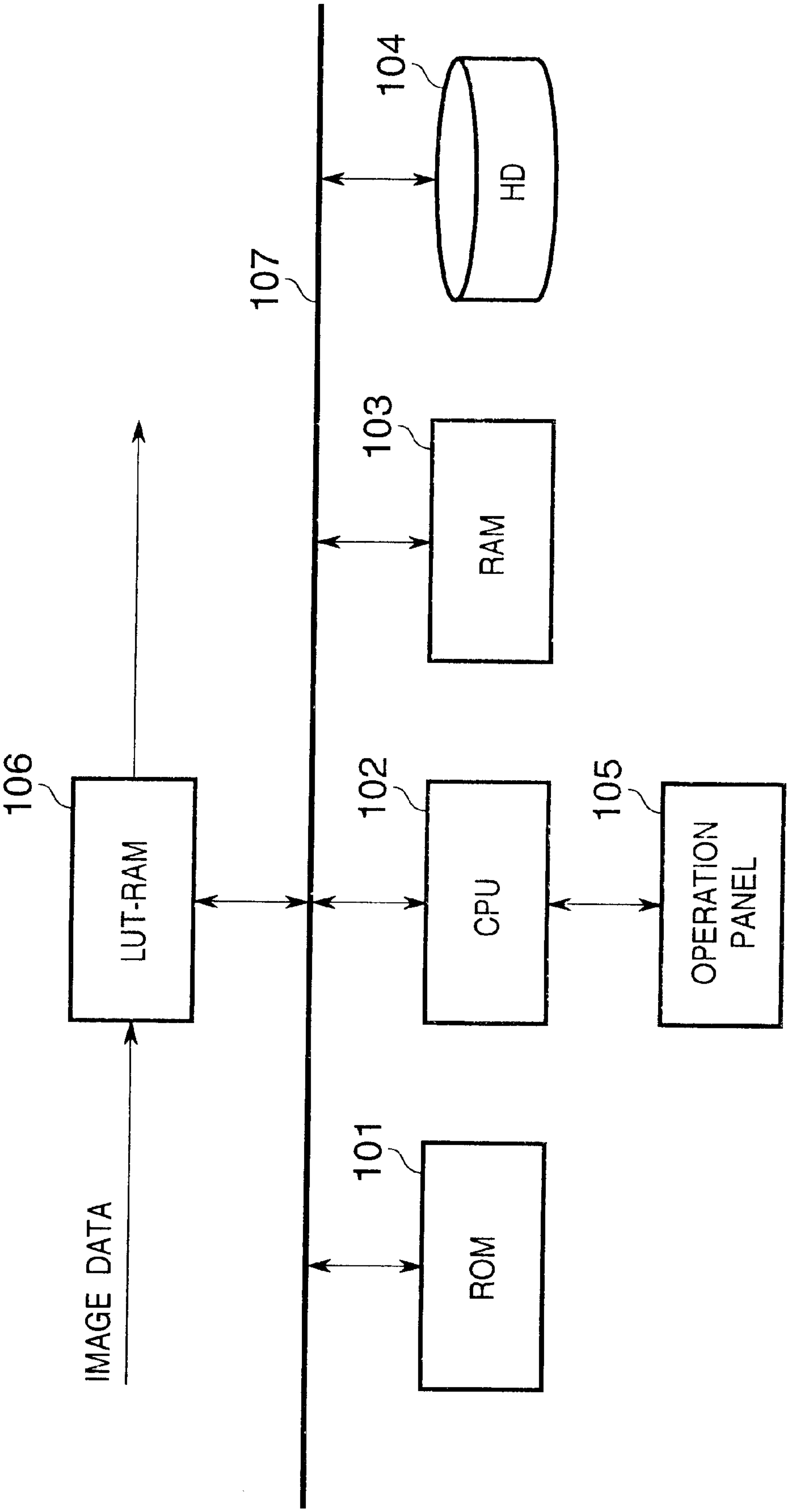
FIG. 6 is a block diagram showing a construction of a converter.

FIG. 6 is a block diagram showing a construction of a converter. A CPU 102 controls operation of the entire converter via a bus 107 in accordance with programs and data stored in a ROM 101, and generates conversion table data according to the present embodiment, using a RAM 103 as a work memory, based on a conversion characteristic 1 stored in the ROM 101 or HD 104 and a conversion characteristic 2 inputted by an operation panel 105. The CPU 102 stores the generated conversion table data in a LUT-RAM 106 connected to an image data bus, then allows image data input to the LUT-RAM 106, thereby performing conversion processing integrating the conversion characteristics 1 and 2 on the image data. The image data on which conversion processing has been performed is transmitted to a printer or the like, which is not shown, for image formation. Note that by operating the operation panel 105, obtained conversion characteristics may be named and stored in the HD 104. When one of the conversion characteristics stored in the HD 104 is instructed by the operation panel 105, the CPU 102 can read the instructed conversion characteristic from the HD 104 and set it in the LUT-RAM 106.

Note that various image input/output devices, e.g., CRT or LCD monitor, a printer, image reader, film reader, digital still camera, digital video camera or the like, and storage devices including storage medium, e.g., magnetic disk, optical disk or the like, may be connected to the LUT-RAM 106 via a predetermined interface. Moreover, image data exchange is possible with a computer device, to which the aforementioned image input/output device and storage device are connected, through a network interface card (NIC). Examples of such network are a network using Ethernet or Fiber Distributed Data Interface (FDDI), a serial bus specified by the IEEE 1394, Universal Serial Bus (USB) or the like.

Processing

Figure 7:
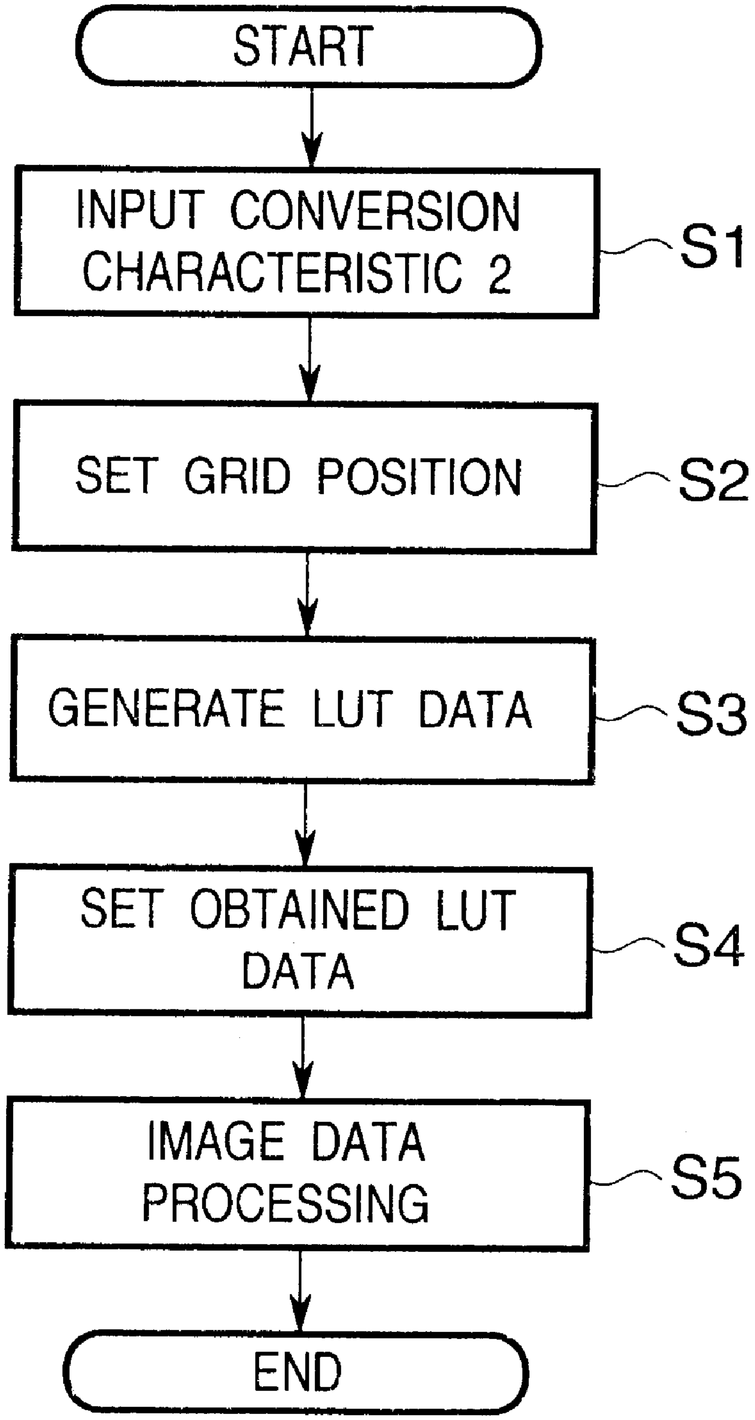
FIG. 7 is a flowchart showing processing executed by a CPU shown in FIG. 6.

FIG. 7 is a flowchart showing an example of processing executed by the CPU 102. When the conversion characteristic 2 is inputted in step S1, a grid position is set in step S2, and a conversion table is generated in step S3. The generated conversion table is set in the LUT-RAM 106 in step S4, then image data is inputted in step S5, and conversion processing is performed, using the LUT-RAM 106.

Although FIG. 6 shows an example of incorporating the converter according to the present embodiment into an image forming apparatus, e.g., a copy machine or the like, the present invention is not limited to this. The present invention may be incorporated in, for instance, an image input apparatus such as an image reader or digital camera, or a computer apparatus such as a personal computer. In this case, the conversion table or LUT according to the present embodiment corresponds to a conversion table in an image processing software operated in a computer apparatus or a software such as a device (printer) driver. Moreover, in the construction in FIG. 6, a digital signal processor (DSP) may be incorporated in addition to the CPU 102 and a program which realizes the processing shown in FIG. 7 may be supplied to the DSP for executing the processing by the DSP.

As has been described above, according to the present embodiment, default conversion processing and user unique conversion processing can be realized by one conversion table. Accordingly, the entire conversion processing can be performed at higher speed than the case of independently performing each conversion processing.

Therefore, the present invention provides a converter and method for executing default conversion processing and user unique conversion processing at high speed, and an image processing apparatus as well as a recording medium.

Moreover, the present invention can also provide a converter and method for suppressing changes in conversion characteristics at the time of integrating conversion processes, and a recording medium.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or the entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiment.

The present invention is not limited to the above embodiments and various changes and modifications can be made within the spirit and scope of the present invention. Therefore, to appraise the public of the scope of the present invention, the following claims are made.

What is claimed is:

1. A conversion method of performing conversion processing by generating a conversion table where two or more conversion processes are integrated, said method comprising the steps of:

obtaining initial grid position data, which is stored in a memory for the conversion table, the grid position data corresponding to a first conversion process to be integrated; and generating the conversion table by consecutively performing each of the conversion processes on the obtained grid position data respectively, and storing the processed grid position data into a table in correlation to the initial grid position data.

2. The method according to claim 1, wherein the grid position data has been stored in the memory as a part of one of the conversion processes.

3. The method according to claim 1, wherein the grid position data is obtained by referring an identifier which is a part of one of the conversion processes.

4. A converter for performing conversion processing by generating a conversion table where two or more conversion processes are integrated, said converter comprising:

an acquisition section, arranged to acquire grid position data corresponding to a permutation of the conversion processes to be integrated, the grid position data being stored in one of information representing the conversion processes to be integrated; and a generator, arranged to generate the conversion table by integrating the conversion processes to be integrated in the integration order, based on the acquired grid position data.

5. The converter according to claim 4, wherein the grid position data is stored in a hash table using a key value calculated from identifiers of conversion processes to be integrated.

6. The converter according to claim 4, wherein said acquisition section acquires the grid position data from information representing the conversion process in a data input end.

7. The converter according to claim 4, wherein said acquisition section acquires the grid position data from information representing the conversion process in a data output end.

8. A converter for performing conversion processing by generating a conversion table where two or more conversion processes are integrated, said converter comprising:

an acquisition section, arranged to acquire a grid position data identifier corresponding to a permutation of the conversion processes to be integrated, the grid position data identifier being stored in one of information representing the conversion processes to be integrated, and acquiring grid position data, corresponding to the acquired grid position data identifier, from the data or another data from which the grid position data identifier is acquired; and a generator, arranged to generate the conversion table by integrating the conversion processes to be integrated in the integration order, based on the obtained grid position data.

9. The converter according to claim 8, wherein the grid position identifier is stored in a hash table using a key value calculated from identifiers of conversion processes to be integrated.

10. The converter according to claim 8, wherein the grid position data identifier designates a data file storing the grid position data.

11. The converter according to claim 8, wherein the grid position data identifier designates a database storing the grid position data.

12. The converter according to claim 8, wherein the grid position data identifier is URI (Uniform Resource Identifier) data.

13. The converter according to claim 8, wherein said acquisition section acquires the grid position data identifier from information representing the conversion process in a data input end.

14. The converter according to claim 8, wherein said acquisition section acquires the grid position data identifier from information representing the conversion process in a data output end.

15. A converter for preforming conversion processing by generating a conversion table where two or more conversion processes are intregrated, said converter comprising:

a storage, arranged to store grid position data respectively corresponding to a permutation of conversion processes;

an acquisition section, arranged to acquire grid position data corresponding to the permutation of conversion processes to be intregrated from said storage; and a generator, arranged to generate the conversion table according to the acquired grid position data.

16. The converter according to claim 15, wherein said storage is configured by a hash table using a key value calculated from identifiers of conversion processes to be integrated.

17. A conversion method of performing conversion processing by generating a conversion table where two or more conversion processes are integrated, said method comprising the steps of:

acquiring grid position data corresponding to a permutation of the conversion processes to be integrated, the grid position data being stored in one of information representing the conversion processes to be integrated; and generating the conversion table by integrating the conversion processes to be integrated in the integration order, based on the acquired grid position data.

18. A conversion method of performing conversion processing by generating a conversion table where two or more conversion processes are integrated, said method comprising the steps of:

acquiring a grid position data identifier corresponding to a permutation of conversion processes to be integrated, the identifier being stored in one of information representing the conversion processes to be integrated;

acquiring grid position data, corresponding to the acquired grid position data identifier, from the data or another data from which the grid position data identifier is acquired; and generating the conversion table by integrating the conversion processes to be integrated in the integration order, based on the acquired grid position data.

19. A conversion method of performing conversion processing by generating a conversion table where two or more conversion processes are integrated, said method comprising the steps of:

acquiring grid position data corresponding to a permutation of conversion processes to be integrated, from a memory storing grid position data respectively corresponding to the permutation of conversion processes; and generating the conversion table according to the acquired grid position data.

20. A computer program product comprising a computer readable medium having computer program code, for performing conversion processing by generating a conversion table where two or more conversion processes are integrated, said product comprising generation procedure code for generating the conversion table based on grid position data respectively corresponding to a permutation of conversion processes to be integrated, the grid position data provided additionally to information representing the conversion processes to be integrated.

21. A computer program product comprising a computer readable medium storing computer program code, for performing conversion processing by generating a conversion table where two or more conversion processes are integrated, said product comprising procedure codes for:

obtaining initial grid position data, which is stored in a memory for the conversion table, the grid position data corresponding to a first conversion process to be integrated; and generating the conversion table by consecutively performing each of the conversion processes on the obtained grid position data respectively, and storing the processed grid position data into a table in correlation to the initial grid position data.

22. A computer program product comprising a computer readable medium having computer program code, for performing conversion processing by generating a conversion table where two or more conversion processes are integrated, said product comprising:

acquisition procedure code for acquiring grid position data corresponding to a permutation of the conversion processes to be integrated, the grid position data being stored in one of information representing the conversion processes to be integrated; and generation procedure code for generating the conversion table by integrating the conversion processes to be integrated in the integration order, based on the acquired grid position data.

23. A computer program product comprising a computer readable medium having computer program code, for performing conversion processing by generating a conversion table where two or more conversion processes are integrated, said product comprising:

first acquisition procedure code for acquiring a grid position data identifier corresponding to a permutation of conversion processes to be integrated, the identifier being stored in one of information representing the conversion processes to be integrated;

second acquisition procedure code for acquiring grid position data, corresponding to the acquired grid position data identifier, from the data or another data from which the grid position data identifier is acquired; and generation procedure code for generating the conversion table by integrating the conversion processes to be integrated in the integration order, based on the acquired grid position data.

* * * * *

UNITED STATES PATENT AND TRADEMARK OFFICE

CERTIFICATE OF CORRECTION

PATENT NO. : 6,490,675 B1 Page 1 of 1
DATED : December 3, 2002
INVENTOR(S) : Sugiura It is certified that error appears in the above-identified patent and that said Letters Patent is hereby corrected as shown below:

Column 5,
Line 63, “X j” should read -- X•j --.

Signed and Sealed this

Twenty-first Day of October, 2003

JAMES E. ROGAN
*Director of the United States Patent and Trademark Office*